UNITED STATES PATENT OFFICE.

JAMES H. M. MORRIS, OF READING, ILLINOIS.

IMPROVED LINIMENT.

Specification forming part of Letters Patent No. 48,198, dated June 13, 1865.

*To all whom it may concern:*

Be it known that I, JAMES H. M. MORRIS, of Reading, in the county of Lexington and State of Illinois, have invented a new and useful Improvement in Liniments for Curing Bruises, Sores, Wounds, &c.; and I do hereby declare that the following is a full, clear, and exact description of the same and the manner of compounding and using it.

In a stone jug or other suitable vessel I place the following ingredients, to wit: spirits of turpentine, seven ounces; Seneca oil, seven and one-half ounces; sweet oil, four ounces; tincture of arnica, four ounces; oils of origanum, hemlock, juniper, amber, and laudanum, each one and one-half ounce; spirits of ammonia, three-fifths of an ounce; gum-camphor, two-sevenths of an ounce; all mixed cold, and allowed to stand for sixty hours, being thoroughly shaken once in three hours, when it is ready for use. The liniment thus prepared may then be applied to wounds, sores, bruises, corns, &c., in the usual manner by rubbing it on the part affected. It is found to be especially beneficial in the case of horses and similar animals.

Having thus described my invention, what I claim is—

The liniment composed of the ingredients compounded in the manner and of the proportions herein described.

JAMES H. M. MORRIS.

Witnesses:
 JOEL WILLET,
 C. W. SHACKELTON.